J. C. KRAUS.
BIRD BATH.
APPLICATION FILED MAY 6, 1916.
1,224,305.
Patented May 1, 1917.
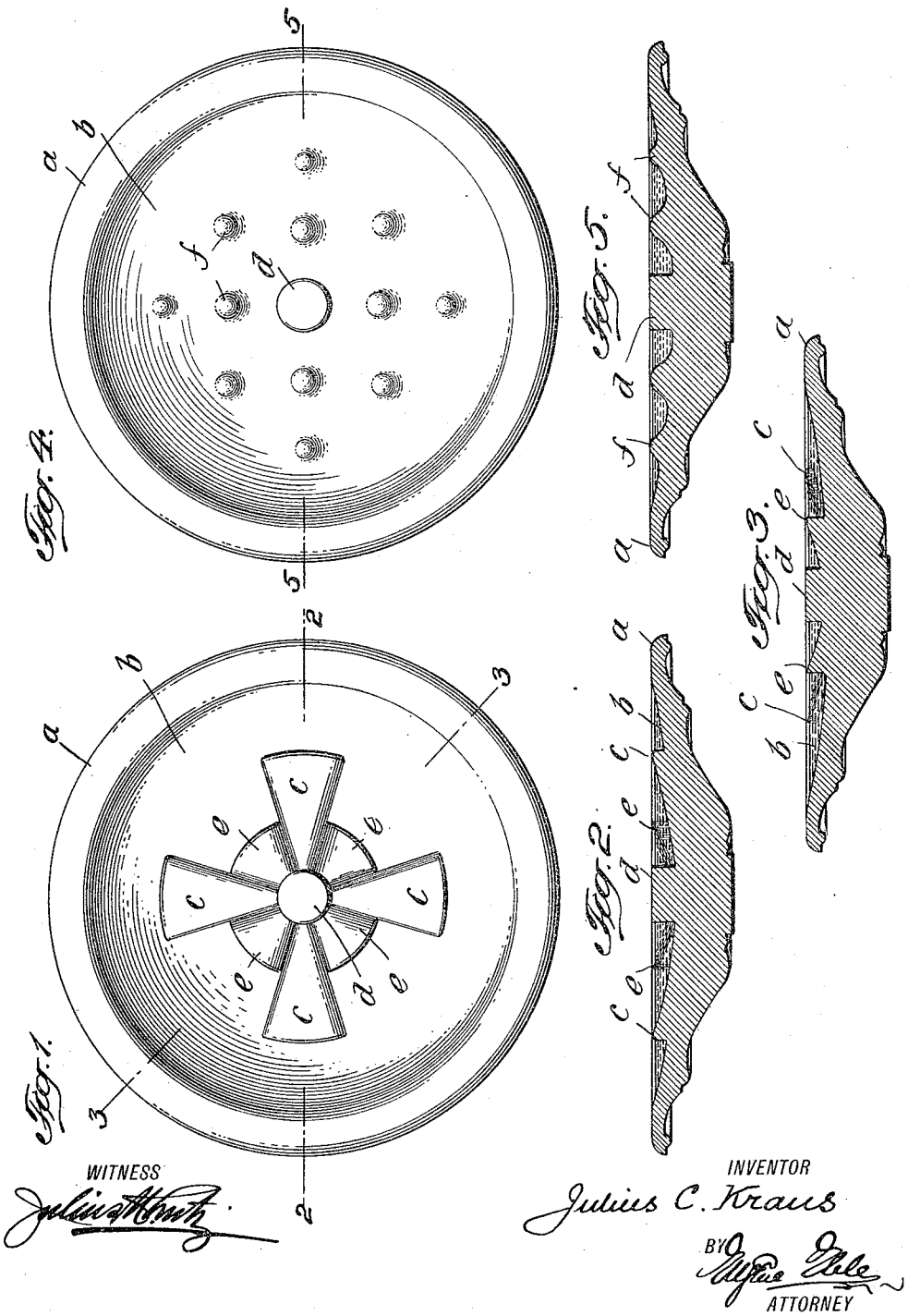
WITNESS
INVENTOR
Julius C. Kraus
BY
ATTORNEY

UNITED STATES PATENT OFFICE.

JULIUS C. KRAUS, OF NEW YORK, N. Y.

BIRD-BATH.

1,224,305. Specification of Letters Patent. Patented May 1, 1917.

Application filed May 6, 1916. Serial No. 95,928.

*To all whom it may concern:*

Be it known that I, JULIUS C. KRAUS, a citizen of the United States, and a resident of the borough of the Bronx, county of the Bronx, city and State of New York, have invented certain new and useful Improvements in Bird-Baths, of which the following is a specification.

A study of the habits of birds demonstrates that in the bird bath formed of the ordinary basin containing water, the bird, owing to what seems to be instinctive fear of danger, will perch only on the rim of the basin and not venture into the expanse of water. I have found, however, that if the basin contains a projection visible to the bird and extending slightly above the level of water, the bird will either wade or fly to such projection, there to bathe, wholly surrounded by water. I am referring particularly to the ordinary small species of birds, such as canaries, sparrows, robbins, etc. It will also be apparent that a bird bath wherein the birds sit not only around the rim of the basin but alight on projections located in the expanse of water adds to attractiveness in appearance.

With these facts in mind I have contrived a basin which is of novel construction as hereinafter described.

In the accompanying drawing Figure 1 represents a plan view of my construction. Fig. 2 represents a cross section of Fig. 1 taken on line 2—2 thereof. Fig. 3 represents a cross section of Fig. 1 taken on line 3—3 thereof. Fig. 4 represents a modified form of my construction and Fig. 5 represents a cross section taken on line 5—5 of Fig. 4.

Having reference to Figs. 1, 2 and 3, *a* represents the rim of the basin, *b* represents the concave basin portion, *c, c, c, c,* represents a series of arms, which in this particular construction radiate from a central point or projection *d*, the said arms slanting from the said central point *d* upwardly toward the rim of the basin so that the uppermost end of said arm will project slightly above the plane of water. It will be understood that the central point *d* also projects slightly above the plane of water. A second series of arms *e, e, e, e,* may also be provided in this particular construction, said arms likewise radiating from the central point or projection *d*, and slanting from the said central point *d* upwardly toward the rim. The arms *e, e, e, e,* of the second series are of greater inclination than the arms *c, c, c, c,* of the first series so that, although shorter, they will at their free ends also slightly project above the plane of water.

A bird will wade or fly from the rim of the basin to one of the first series of projections, will perch on the end projecting above the water and thereafter will wade down the incline of said arm to the greater depth of water until it reaches and perches upon the center projection. Eventually the bird will familiarize itself with the absence of danger and will freely wade or fly from the rim of the basin to one of the projections there to bathe, wholly surrounded by water.

In the modification shown in Figs. 4 and 5 the projections extending from the concave portion of the basin are in the form of a plurality of upright teats which serve the same purpose as the projections or arms illustrated in Fig. 1. Obviously the projections in the basin may be made of a variety of designs and in a variety of heights or dimensions, but as shown in the drawings all of the projections terminate in approximately the same plane.

What I claim is:

1. A bird bath comprising a vessel adapted to contain water, a projection extending upwardly from a point central of the inner surface of the said vessel, a plurality of radially disposed projections extending from the said central projection toward the rim of the vessel in an inclined plane and terminating above the water line of said vessel.

2. A basin adapted for use as a bird bath comprising a vessel adapted to contain water, a plurality of projections sloping upwardly from the center of the inner surface of the basin, the apex of such projections being approximately in line with the horizontal plane of the rim of said basin.

3. A bird bath comprising a circular vessel adapted to contain water and a plurality of projections integrally formed upon the inner surface of the vessel, said projections radiating from the center toward the rim of said vessel in an inclined plane.

4. A bird bath comprising a circular vessel adapted to contain water, a plurality of sloping projections formed upon the inner surface of said vessel, said projections terminating in substantially the same horizontal plane and approximately in line with the horizontal plane of the rim of the vessel.

In witness whereof I have hereunto set my hand this 5th day of May, 1916.

JULIUS C. KRAUS.

Copies of this patent may be obtained for five cents each, by addressing the "Commissioner of Patents, Washington, D. C."